United States Patent [19]

Uchidoi et al.

[11] Patent Number: 4,681,441
[45] Date of Patent: Jul. 21, 1987

[54] LIGHT MEASURING DEVICE

[75] Inventors: Masanori Uchidoi, Tokyo; Nobuyuki Suzuki, Kanagawa, both of Japan

[73] Assignee: Canon Kabushiki Kaisha, Tokyo, Japan

[21] Appl. No.: 834,492

[22] Filed: Feb. 24, 1986

Related U.S. Application Data

[63] Continuation of Ser. No. 529,966, Sep. 7, 1983, abandoned.

[30] Foreign Application Priority Data

Sep. 8, 1982 [JP] Japan ................................ 57-157161

[51] Int. Cl.$^4$ ............................................. G01J 1/44
[52] U.S. Cl. ................................ 356/222; 250/214 P; 354/432; 354/434
[58] Field of Search ............... 356/218, 223, 224, 226, 356/222; 354/429–434; 250/214 SW, 214 P

[56] References Cited

U.S. PATENT DOCUMENTS

| 3,700,319 | 10/1972 | Gallina | 250/214 R X |
| 3,753,388 | 8/1973 | Toyoda | 356/218 |
| 3,781,119 | 12/1973 | Mori | 356/222 |
| 3,855,604 | 12/1974 | Krause | 354/410 |
| 3,877,039 | 4/1975 | Ichinohe et al. | 354/427 |
| 3,889,276 | 6/1975 | Shirai | 354/432 |
| 3,973,266 | 8/1976 | Kakunodate et al. | 356/226 X |
| 4,289,389 | 9/1981 | Kobori et al. | 354/429 |
| 4,306,807 | 12/1981 | Sakane et al. | 356/218 X |

Primary Examiner—Vincent P. McGraw
Attorney, Agent, or Firm—Toren, McGeady & Associates

[57] ABSTRACT

A light measuring device which is provided with a plurality of light sensitive elements and is arranged to selectively detect outputs of these light sensitive elements includes means for short-circuiting both terminals of the light sensitive element not required for detection in a light measuring mode selected out of different light measuring modes.

15 Claims, 7 Drawing Figures

LIGHT MEASURING DEVICE

This is a continuation of application Ser. No. 529,966, filed Sept. 7, 1983, now abandoned.

BACKGROUND OF THE INVENTION

1. Field of the Invention:

This invention relates to a light measuring device for a camera and particularly to a light measuring device which is capable of selectively using some of a plurality of light sensitive elements assigned to different light measuring areas.

2. Description of the Prior Art:

There have been known light measuring devices for cameras of the kind arranged to use a plurality of light sensitive elements and to be shiftable between an averaging light measuring mode and a spot light measuring mode by selecting some of these light sensitive elements.

The method employed in the light measuring devices of the prior art for shifting one light measuring mode to the other is as shown in FIGS. 1 and 2 of the accompanying drawings. For simplification of illustration, let us assume that two light sensitive elements are used in the light measuring device and that either one of these light sensitive elements is selected by means of a change-over switch to accomplish a light measuring operation selectively in the averaging light measuring mode or in the spot light measuring mode.

FIG. 1 is a plan view of an example of the prior art light sensitive element arranged to be used in the light measuring device. Two light sensitive elements such as SPC (silicon photo-cells) or the like are formed into one unified light receiving element 1. A first light sensitive element 1a which is for the spot light measuring mode is arranged to measure the brightness of a part in the middle portion of a picture plane to be used in photographing with the light receiving element 1 set in a known light receiving position (not shown) of the camera. Another light sensitive element 1b which is for the averaging light measuring mode is arranged to measure the brightness of the remaining portion of the picture plane excluding the middle part to be measured by the light sensitive element 1a.

As shown in FIG. 2, these light sensitive elements 1a and 1b are connected in parallel with each other via a change-over switch 5. In the drawing, the change-over switch 5 is shown as a mechanical switch for the sake of simplification of illustration. Actually, however, this switch is arranged to be a semi-conductor switch. The output terminals of these light sensitive elements are connected respectively to the two input terminals of an operational amplifier 3 (hereinafter an operational amplifier will be called OP amp. for short). The OP amp. 3 is of a high input impedance and uses a MOSFET (an MOS type field effect transistor) or the like for the first stage of its output terminal. To the feedback route of this OP amp. 3 is connected a diode 4 which logarithmically compresses the photo-currents of the above-stated light sensitive elements. With the prior art light measuring device arranged in the manner as described above, when the switch 5 is closed, the sum of the photocurrents of the light sensitive elements 1a and 1b is logarithmically compressed by the diode 4 and appears at the output terminal 3A of the OP amp. 3 as a light measurement value in the form of a voltage. In other words, averaging light measurement is carried out in this manner.

Further, when the switch 5 is opened, the photo-current produced from the light sensitive element 1b does not flow to the diode 4. Meanwhile, the photo-current from the other light sensitive element 1a alone is logarithmically compressed and converted into a voltage. This voltage is then produced as a light measurement value from the output terminal 3A of the OP amp. 3 and is applied to an exposure control circuit such as an electric shutter arrangement. Thus, a spot light measuring operation is carried out.

In the case of the light measuring device of the prior art, the above-stated spot light measurement can be carried out when the change-over switch 5 is completely opened. Actually, however, there exists a resistance called "off resistance," which makes a completely open state of the switch not readily attainable. Therefore, the light measuring device of the prior art has been incapable of carrying out accurate spot light measurement. In other words, in the case of the prior art device, a portion of the photo-current produced from the light sensitive element 1b flows via the above-stated "off resistance" to the diode 4 during a spot light measuring operation and this hinders correct spot light measurement which should be accomplished solely on the basis of the photo-current of the light sensitive element 1a. Further, this light measurement error resulting from the "off resistance" increases in proportion to the ratio of the photo-current of the light sensitive element 1a to that of the light sensitive element 1b produced when the switch 5 is closed. More specifically, the error increases with area ratio of the light receiving surface of the light sensitive element 1a to that of the light sensitive element 1b (assuming that the light sensitive element 1 has uniform sensitivity irrespectively of difference in position thereof). Therefore, the narrower the spot region of the spot light measurement (the light receiving area on the surface of the light sensitive element 1a), the more the light measuring error becomes unallowable.

Another shortcoming of the prior art light measuring device has resided in that: When the switch 5 is in an open condiiton, the light sensitive element 1b which has one terminal thereof in an open state comes to be connected to the inversion input terminal of the OP amp. 3. As a result when the quantity of light to be received by the light sensitive element 1b is small and the impedance of the light sensitive element 1b becomes large in particular, the device becomes vulnerable to an induced noise, which is apt to result in a light measurement error.

SUMMARY OF THE INVENTION

It is therefore an object of the present invention to provide a light measuring device which eliminates the above-stated shortcomings of the prior art device and is capable of accurately performing light measurement in every light measuring mode selected.

It is another object of the invention to provide a light measuring device which is not readily affected by variations in the voltage of a power source.

It is a further object of the invention to provide a light measuring device which is not readily affected by variations in the load thereon.

These and further objects and features of the invention will become apparent from the following detailed description of preferred embodiments thereof taken in conjunction with the accompanying drawings.

DETAILED DESCRIPTION OF PREFERRED EMBODIMENTS

Figure 2:
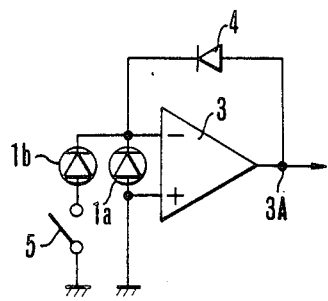
FIG. 2 is a circuit diagram showing the prior art light measuring device.
Figure 3:
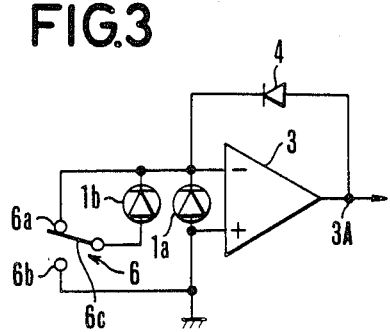
FIG. 3 is a circuit diagram showing the circuit arrangement of a light measuring device as a first embodiment example of the present invention.
Figure 4:
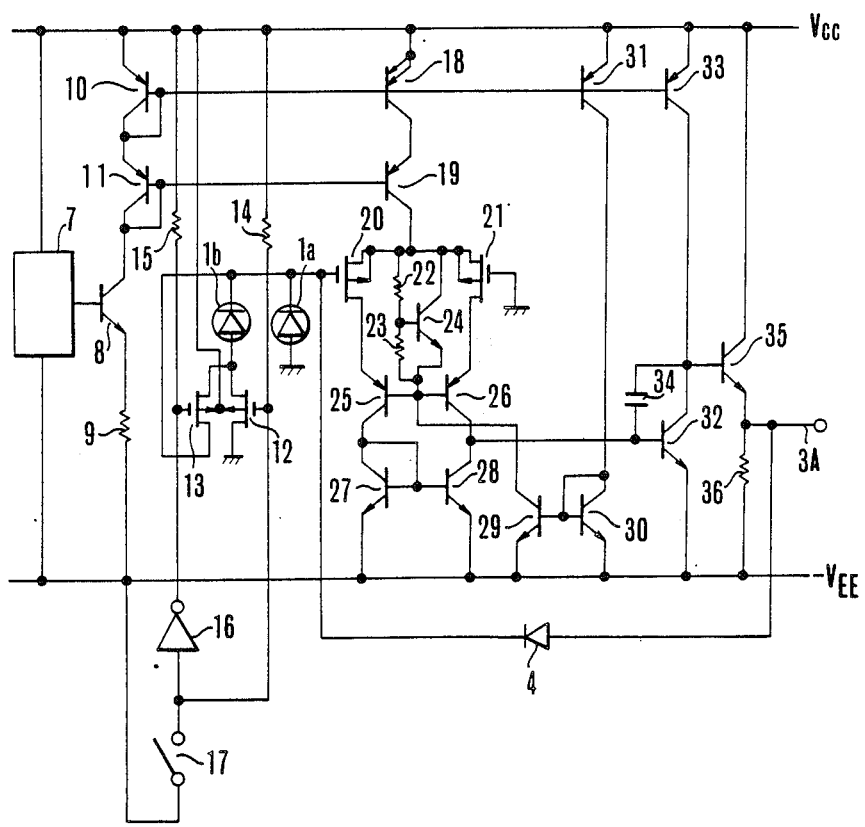
FIG. 4 is a circuit diagram showing in more detail the circuit arrangement of the first embodiment example.
Figure 7:
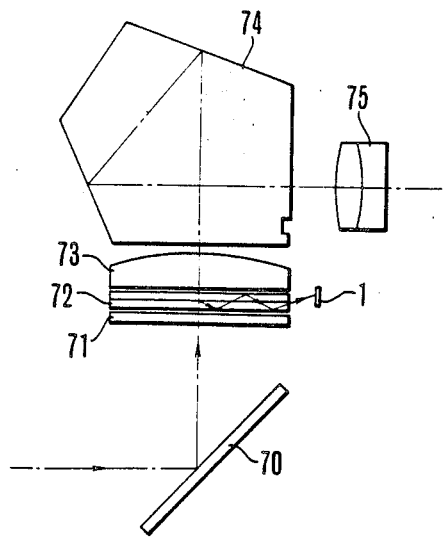
FIG. 7 is a schematic illustration showing the light measuring optical system to be used in the first and second embodiment examples of the invention.

FIG. 3 is a circuit diagram showing a light measuring device for a camera to which the present invention is applied as a first embodiment example thereof. In FIG. 3, elements indicated by the same reference numerals and symbols as those used in FIG. 2 function in the same manner. Therefore, their functions will be omitted from the following description. The embodiment is provided with a light receiving element 1 which is arranged in the same manner as in the case of FIGS. 1 and 2 and is disposed in a position as shown in FIG. 7, which shows the light measuring optical system of the embodiment. Referring to FIG. 7, a light flux from an object to be photographed is reflected by a reflex mirror 70 and passes through a focusing screen 71. A portion of the light flux then repeats total reflection at the upper and lower surfaces of a micro beam splitter 73 and is then guided to the light receiving element 1. The rest of the light flux is guided to an eyepiece 75 passing through the micro beam splitter 73 and a pentagonal prism 74. Referring now to FIG. 3, the embodiment includes a change-over switch 6. The switch 6 has a fixed contact 6a which is connected to the inversion input terminal of the OP amp. 3; another fixed contact 6b which is connected to the non-inversion input terminal of the OP amp. 3 and to the ground; and a movable contact 6c which is connected to the anode of a photo-diode 1b. When a spot light measuring mode is selected, the movable contact 6c is connected to the contact 6a. The movable contact 6c is connected to the contact 6b when an averaging light measuring mode is selected. In FIG. 3, the switch 6 is shown as a mechanical switch. However, this is for the sake of simplification of the illustration. Actually, a semi-conductor switching element arrangement will be employed as the switch 6 as shown in FIG. 4, which shows a more specific example of the light measuring circuit of FIG. 3. The light measuring device which is arranged in this manner in accordance with this invention operates as follows:

When the averaging light measuring mode is selected, the movable contact 6c of the switch 6 is connected to the contact 6b. In this instance, the light sensitive elements 1a and 1b are parallel connected with each other. This parallel circuit is connected to the two input terminals of the OP amp. 3. The sum of the photo-currents of the light sensitive element 1a and 1b then flows to the diode 4. A voltage obtained by logarithmically compressing the sum of the photo-currents is produced at the output terminal 3A of the OP amp. 3 as a result of light measurement.

In case where the spot light measuring mode is selected, the movable contact 6c of the switch 6 is connected to another contact 6a. In that event, both terminals of the light sensitive element 1b (a photo-diode) are short-circuited. Then, the photo-current of the light sensitive element 1a (a photo-diode) alone flows to the diode 4. This photo-current is solely logarithmically compressed and appears in the form of a voltage at the output terminal 3A of the OP amp. 3 as a value representing the result of measurement of the brightness of an object to be photographed. Since both the terminals of the light sensitive element 1b are short-circuited in this case, the photo-current of the light sensitive element 1b never flows to the ground side via the off resistance mentioned in the foregoing even if there exists the off resistance between the contact 6b and the movable contact 6c which serves as a common terminal of the switch 6.

In accordance with this invention, therefore, no current other than the photo-current of the light sensitive element 1a flows to the diode 4 when the spot light measuring mode is selected.

With regard to the problem of the induced noise which has heretofore been encountered in the event of low brightness with the prior art light measuring device arranged as shown in FIG. 2, the arrangement to short-circuit both terminals of the light sensitive element 1b in accordance with this invention effectively prevents such induced noises. In accordance with this invention, therefore, an accurate light measurement value can be obtained either in the averaging light measuring mode or in the spot light measuring mode.

An example of specific arrangement of the light measuring device shown in FIG. 3 is as shown in FIG. 4. Referring to FIG. 4, the device includes a constant voltage circuit 7 which has power source voltage VCC and −VEE impresses thereon and is arranged to produce a constant voltage VR in response to the power source voltage −VEE; an NPN transistor 8 which has the voltage VR from the constant voltage circuit 7 impressed on the base thereof; a resistor 9 which is connected between the emitter of the transistor 8 and the power source −VEE; and NPN transistors 10 and 11 which are both diode connected (short-circuited between the base and the collector). The emitter of the transistor 10 is connected to the power source VCC, the collector of the transistor 10 to the emitter of the transistor 11 and the collector of the transistor 11 to the collector of the transistor 8. A constant current circuit is formed jointly by these elements 7-11. The device further includes MOS type field effect transistors (hereinafter will be called MOSFET's) 12 and 13. They become conductive when the level of their gates becomes low and are used as analog switches. Their substrate gates are both connected to the power source VCC while their drains are connected to the light sensitive element 1b. The source of the MOSFET 12 is grounded while the source of the other MOSFET 13 is connected to the cathode of the light sensitive element 1b. Resistors 14 and 15 are arranged to pull up the gates of the MOSFET's 12 and 13. An inverter 16 has its output terminal connected to the gate of the MOSFET 13. A switch 17 has one terminal thereof connected to the power source −VEE and the other terminal to the input terminal of the inverter 16 and the gate of the MOSFET 12. When the switch 17 is closed, the level of the gate of the MOSFET 12 becomes low to result in a conductive state between the drain and the source thereof. Meanwhile, the level of the gate of the other MOSFET 13 becomes high via the inverter 16. Therefore, the MOSFET 13 becomes non-conductive between its drain and its source, i.e. it is off. A reference numeral 18 denotes a PNP transistor. The number of the emitters of the transistor 18 is twice as many as that of the transistor 10. Besides, since the base and emitters are connected in common, a current which is twice as high as that of the transistor 10 flows between the emitters and the collector of the transistor 18. A numeral 19 also denotes a PNP transistor. The emitter of the transistor 19 is connected to the collector of the transistor 18 while the base of the transistor 19 is connected to the base of the transistor 11. The transistor 19 is thus arranged to serve as a base grounding amplifier. Numerals 20 and 21 denote Pch MOSFET's which have their sources connected together and form a differential amplfier. The substrate gates of the Pch MOSFET's 20 and 21 are connected to the sources. The gate of the MOSFET 21 is grounded and serves as a terminal corresponding to the noninversion input terminal of the OP amp. 3 which is shown in FIGS. 2 and 3. Meanwhile the gate of the other MOSFET 20 is connected to the cathodes of the light sensitive elements 1a and 1b. The gate is thus arranged to serve as a terminal corresponding to the inversion input terminal of the OP amp. 3. The circuit arrangement further includes resistors 22 and 23 and an NPN transistor 24. The connection point of the resistors 22 and 23 is connected to the base of the transistor 24. The other terminal of the resistor 22 is connected to the collector of the transistor 24. The other terminal of the resistor 23 is connected to the emitter of the transistor 24. The resistors 22 and 23 serves as sources of the MOSFET's 20 and 21 and also form a level shift circuit between the bases of transistors 25 and 26. The bases of the transistors 25 and 26 which are PNP transistors are connected together. The emitter of the transistor 25 is connected to the drain of the MOSFET 20. The emitter of the transistor 26 is connected to the drain of the MOSFET 21. In other words, these transistors 25 and 26 serve as a base grounding amplification circuit and form a cathode amplifier in conjunction with the MOSFET's 20 and 21. Numerals 27 and 28 denote NPN transistors. The emitters of the transistors 27 and 28 are grounded while their bases are connected together. The transistor 27 is diode-connected and is connected to the collector of the transistor 25. The transistor 28 has its collector connected to the collector of the transistor 26. The transistors 27 and 28 are thus arranged to serve as current mirror loads for the transistors 25 and 26 respectively. Further included in the circuit arrangement are NPN transistors 29 and 30 both of which have their emitters grounded. The transistor 30 is diode connected, that is, the transistor is current mirror connected. A PNP transistor 31 has its base and emitter connected in common with the transistor 10. Therefore, the collector current of the transistor 10 becomes the same as that of the transistor 31. The current is transferred to the current mirrors of transistors 29 and 30. Another NPN transistor 32 has its emitter grounded and its base connected to the collectors of the transistors 26 and 28. The collector of the transistor 32 is connected to the collector of a transistor 33. Since the transistor 33 is a constant current source as will be described later herein, the transistor 32 forms a voltage amplification stage of emitter grounding. The transistor 33 is a PNP transistor which has its base and emitter connected in common with those of the transistor 10. The collector current of the transistor 33 thus serves as the same constant current source as that of the transistor 10. A capacitor 34 is provided for a phase compensating purpose and is connected between the base and the collector of the transistor 32. An NPN transistor 35 which has its collector connected to the line of the power source VCC and its emitter to a resistor 36. The transistor 35 thus forms an emitter follower circuit. This emitter of the trarsistor 35 corresponds to the output terminal of the OP amp. 3 shown in FIGS. 2 and 3. A resistor 36 is connected between the emitter of the transistor 35 and the line of the power source $-$VEE. Photo-diodes 1a and 1b are arranged to serve as light sensitive elements and to funciton in the same manner as the diode 4 shown in FIGS. 2 and 3.

The light measuring device which is arranged as has been described above operates as follows: When a power source switch which is not shown is depressed to have predetermined voltages impressed on the power source lines VCC and $-$VEE, the constant voltage circuit 7 produces a constant voltage VR. The voltage VR is impressed between the base and emitter of the transistor 8 and on the resistor 9. As a result of that, the collector current of the transistor 8 becomes (VR$-$VBE/R), wherein R represents the resistance value of the resistor 9 and VBE the voltage between the base and emitter of the transistor 8. The collector current flows to the transistors 10 and 11 which are diode connected. Since the base and the emitter of the transistor 10 and those of the transistors 18, 31 and 33 are connected in common, the transistors 31 and 33 become a constant current source which produces the same current as (VR$-$VBE/R) while the transistor 18 becomes a constant current source which produces a current twice as high as (VR$-$VBE/R). Further, since the base of the transistor 19 is at the same potential as the base of the transistor 11, the value of the potential of the emitter of the transistor 19, i.e. the value between the collector and the emitter of the transistor 18 becomes constant irrespectively of the power sources VCC and $-$VEE. The level shift circuit formed by the resistors 22 and 23 and the transistor 24 is connected to the sources of the MOSFET's 20 and 21 and to the bases of the transistors 25 and 26. Therefore, even if the source voltages of the MOSFET's 20 and 21 fluctuate due to some reason, there would occur no change between the gate and the drain of the MOSFET's. Further, the current (VR$-$VBE/R) from the constant current source of transistor 31 also flows to the level shift circuit (consisting of the resistors 22 and 23 and the transistor 24) via the transistors 29 and 30 which form a current mirror. The collector current of the transistor 19 flows to the sources of the MOSFET's 20 and 21. This current is (VR$-$VBE/R) and is the same as the current of the constant current source of transistor 31 obtained by subtracting a current flowing to the level shift circuit (the same current as the constant current of the transistor 31) from a current flowing to the transistor 18, since the constant current source of transistor 18 causes a flow of a current twice as much as the current of the constant current source of the transistor 31.

In case where some changes happen in the power source voltages VCC and $-$VEE, since the emitter collector voltage of the transistor 18 is fixed at a constant value as mentioned in the foregoing, there takes place no early effect (base width modulation effect) of the transistor. Therefore, a constant current is supplied to the common source of the differential amplification stage formed by the MOSFET's 20 and 21 despite of the change in the power source voltage. Therefore, even if the characteristics of the MOSFET's 20 and 21 are uneven, the variation in the power source voltage never causes any change in the output of the differential amplification stage. In other words, the output of the device which is the potential of the emitter of the transistor 35 remains unchanged as long as the light applied to the light sensitive elements 1a and 1b reamins unchanged.

In case where a load which is not shown but is connected to the emitter of the transistor 35 momentarily becomes an overload for the transistor 35 and the resistor 36, the differential amplification stage loses the balance and the output, i.e. the potential of the emitter of the transistor 35 also changes to a great degree. However, the presence of the level shift circuit keeps the voltage between the gate and the drain of the MOSFET 20 unchanged as mentioned in the foregoing. Therefore, the capacity existing between the gate and the drain also remains unchanged. The recovery of the output at the time of return from the overload state to the normal state can be promptly effected because no charging time is required to make up for the variation in the capacity between the gate and drain.

When the averaging light measurirg mode is selected by the operator and the switch 17 is closed accordingly, the level of the gate of the MOSFET 12 becomes low while that of the gate MOSFET 13 becomes high. As a result, there obtains a conductive state between the drain and the source of the MOSFET 12. The anode of the light sensitive element 1b is grounded. The sum of the photo-currents of the light sensitive elements 1a and 1b flows to the diode 4. A voltage obtained by logarithmically compressing the photo-current then appears at the output terminal 3A (the emitter of the transistor 35). Next, when the spot light measuring mode is selected and the switch 17 is opened, the level of the gate of the MOSFET 13 is caused to become low via the output of the inverter 16. Therefore, a conductive state obtains between the drain and the source of the MOSFET 13. This causes both terminals of the light sensitive element 1b to be short-circuited. As a result of that, the photo-current of the light sensitive element 1a solely flows to the diode 4. A voltage obtained by logarithmically compressing this photo-current then appears at the output terminal 3A. Since both terminals of the light sensitive element 1b are short-circuited in this instance, the light measuring device is completely free from the adverse effect of an off resistance which exists at the MOSFET 12 and that of any induced noise that might otherwise be produced.

Figure 1:
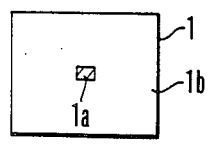
FIG. 1 is a plan view showing light sensitive elements used in the light measuring device of the prior art.
Figure 5:
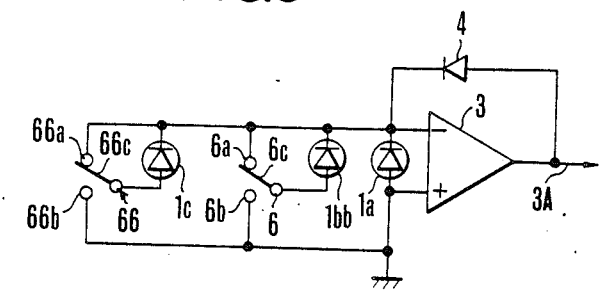
FIG. 5 is a circuit diagram showing a second embodiment example of the invention.
Figure 6:
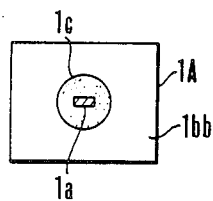
FIG. 6 is a plan view showing light sensitive elements to be used in the light measuring device of FIG. 5.

A second embodiment example of the invention is arranged as shown in FIG. 5. In this case, the invention is also applied to the light measuring device of a camera in the same manner as in the first embodiment example described in the foregoing. In FIG. 5, the circuit elements performing the same functions as those shown in FIGS. 1–3 are indicated by the same reference numerals and their functions are omitted from the following description. This embodiment includes a light sensitive element 1c which is arranged to measure the brightness of a portion of the picture plane encompassing the middle part for which the light sensitive element 1a is arranged to measure the brightness thereof as shown in FIG. 6. The cathode of the light sensitive element 1c is connected to the inversion input terminal of the OP amp. 3. The anode of the light sensitive element 1c is grounded via the movable contact 66c and the fixed contact 66b of a change-over switch 66. Another light sensitive element 1bb roughly corresponds to the light sensitive element 1b which is shown in FIGS. 1–3. The light sensitive element 1bb is thus arranged to measure the brightness of the remaining portion of the picture plane excluding the middle portion which is covered by other light sensitive elements 1a and 1c as shown in FIG. 6. This light sensitive element 1bb has its cathode connected to the inversion input terminal of the OP amp. 3 and its anode arranged to be grounded via the movable contact 6c and the fixed contact 6b of the change-over switch 6. These change-over switches 66 and 6 are actually formed by means of semi-conductor switching elements in such a manner as shown in FIG. 4 although they are shown in the form of mechanical switches in FIG. 5 for the sake of illustration.

With the light measuring device arranged in this manner, when, for example, the movable contact 6c of the change-over switch 6 is connected to the fixed contact 6a and the movable contact 66c of the other change-over switch 66 to the fixed contact 66a, both terminals of the light sensitive element 1bb (a photo-diode) and those of the light sensitive element 1a (a photo-diode) are respectively short-circuited. Then, the photo-current of the light sensitive element 1a (a photo-diode) alone flows to the diode 4. The photo-current is logarithmically compressed alone by the diode 4 and appears in the form of a voltage at the output terminal 3A of the OP amp. 3 as a value representing the result of measurement of the brightness of an object to be photographed.

In this instance, since both terminals of each of the light sensitive elements 1bb and 1c are short-circuited, the photo-currents of the light sensitive elements 1bb and 1c never come to flow to the ground side via any off resistance, in the same manner as in the first embodiment example, even if there exist an off resistance between the contact 6b and the movable contact 6c which is a common terminal of the change-over switch 6 and an off resistance between the contact 66b and the movable contact 66c which is a common terminal of the switch 66b.

Therefore, this embodiment example also give the same advantageous effect as in the first embodiment example.

The operation of the embodiment shown in FIGS. 5 and 6 in the other light measuring mode is almost identical with that of the first embodiment example and therefore does not require further description thereof.

As will be apparent from the foregoing description, the light measuring device according to the present invention gives accurate results of light measurement in all the different light measuring modes.

What we claim:

1. A light measuring device having a plurality of light sensitive elements and being arranged to selectively detect the outputs of said light sensitive elements, comprising:

means for short-circuiting both terminals of the light sensitive element which is not required for detection in a light measuring mode selected out of different light measuring modes.

2. A light measuring device according to claim 1, wherein said light sensitive elements include a first light sensitive element for receiving a light flux coming from a middle part of a brightness measuring object and a second light sensitive element for receiving a light flux coming from the remaining part of the object excluding said middle part to be measured by said first light sensitive element.

3. A light measuring device according to claim 2, wherein said first and second light sensitive elements are arranged in one unified form with the second light sensitive element arranged to encompass the periphery of said first light sensitive element.

4. A light measuring device according to claim 2, wherein, when an averaging light measuring mode is selected, said short-circuiting means serves to connect said second light sensitive element in parallel with said first light sensitive element.

5. A light measuring device for a camera, comprising:
    (a) a differential amplifier having two input terminals and an output terminal;
    (b) first light sensitive means, connected between the two input terminals of said differential amplifier, for receiving a light flux coming from the middle part of a scene to be photographed;
    (c) second light sensitive means for receiving a light flux coming from the remaining part of said scene excluding the middle part to be measured by said first light sensitive means; and
    (d) selecting means, connected to said second light sensitive means, for short-circuiting said second light sensitive means when a spot light measuring mode is selected and for connecting the second light sensitive means in parallel with said first light sensitive means when an averaging light measuring mode is selected.

6. A light measuring device according to claim 5, wherein said differential amplifier comprises a pair of field effect transistors.

7. A light measuring device according to claim 6, wherein:
    (a) the two source electrodes of said pair of field effect transistors are connected in common;
    (b) there is provided a constant current source connected to said two source electrodes to supply a constant current to said source electrodes, an output stage of said constant current source being formed by a transistor; and
    (c) there is further provided voltage control means connected to said constant current source for making a voltage between the emitter and the collector of said transistor of the constant current source unvarying.

8. A light measuring device comprising:
    (a) first light sensitive means having a first light measuring range,
    (b) second light sensitive means having a second light measuring range different from the light measuring range of the first light sensitive means;
    (c) output means for producing an electrical signal, and
    (d) electric change-over switching means for short-circuiting only one of the light sensitive means which is not in use and connecting the other light sensitive means to said output means so as to apply the output signal of the other light sensitive means to said output means.

9. A light measuring device according to claim 8, wherein said first light measuring means is arranged to receive the light from the center of a scene.

10. A light measuring device according to claim 9, wherein said second light measuring means is arranged to receive the light from the periphery of the scene.

11. A light measuring device comprising:
    (a) output means for producing an electrical signal;
    (b) first light sensitive means having a first light measuring range, the first light sensitive means being functionally connected to said output means for supplying an electrical signal corresponding to the incident light thereon to said output means;
    (c) second light sensitive means having a second light measuring range different from the light measuring range of the first light sensitive means, the second light sensitive means being functionally connected to said output means for supplying an electrical signal corresponding to the incident light thereon to said output means; and
    (d) electric switching means for short-circuiting one of the light sensitive means which is not in use.

12. A light sensitive device according to claim 11, wherein said electric switching means is a selecting switch normally connected in parallel between said first light sensitive means and said second light sensitive means, and when desired, short-circuits said first light sensitive means and releases the parallel connection between said first light sensitive means and said second light sensitive means.

13. A light measuring device according to claim 11, wherein said first light sensitive means is arranged to receive incident light from the center of a scene.

14. A light measuring device according to claim 13, wherein said second light sensitive means is arranged to receive incident light from the periphery of the scene.

15. A light measuring device according to claim 14, wherein said second light sensitive means has a hollow light sensitive wall arranged outside said first light sensitive means.

* * * * *